US010145152B2

(12) United States Patent
Beck et al.

(10) Patent No.: US 10,145,152 B2
(45) Date of Patent: *Dec. 4, 2018

(54) DOOR HANDLE WITH REMOVABLE CAP (71) Applicant: Huf Hülsbeck & Fürst GmbH & Co. KG, Velbert (DE)

(72) Inventors: Andreas Beck, Bochum (DE); Martin Witte, Ahaus (DE); Ulrike Fichert, Wuppertal (DE); Igor Gorenzweig, Wuppertal (DE); Stefan Mönig, Schwelm (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 99 days.

This patent is subject to a terminal disclaimer.

(21) Appl. No.: 14/941,478

(22) Filed: Nov. 13, 2015

(65) Prior Publication Data

US 2016/0145910 A1    May 26, 2016

(30) Foreign Application Priority Data

Nov. 13, 2014  (DE) .......................... 10 2014 116 641

(51) Int. Cl.
*E05B 63/00* (2006.01)
*E05B 17/18* (2006.01)
(Continued)

(52) U.S. Cl.
CPC ................ *E05B 81/77* (2013.01); *B60J 5/04* (2013.01); *E05B 17/10* (2013.01); *E05B 17/14* (2013.01);
(Continued)

(58) Field of Classification Search
CPC .......... E05B 81/77; E05B 81/04; E05B 81/10; E05B 81/56; E05B 81/82; E05B 81/86;
(Continued)

(56) References Cited

U.S. PATENT DOCUMENTS 1,369,506 A * 2/1921 Voight ................. E05B 17/183
                                                              70/455
1,618,997 A * 3/1927 Radandt ................. B60R 25/04
                                                              224/42.25
(Continued)

FOREIGN PATENT DOCUMENTS

CN    102575487 A    7/2012
CN    102597400 A    7/2012
(Continued)

OTHER PUBLICATIONS

European Search Report, dated Apr. 7, 2016, for corresponding European Patent No. 15 17 4635 with English translation.
(Continued)

*Primary Examiner* — Suzanne L Barrett
*Assistant Examiner* — Morgan J McClure
(74) *Attorney, Agent, or Firm* — Intellectual Property Law Group LLP (57) ABSTRACT The invention relates to a door handle (10) for a vehicle door of a motor vehicle, with a removable cover element (11), in particular for covering a lock cylinder (101), wherein the lock cylinder (101) is provided for unlocking and locking a door lock, and wherein the cover element (11) can be transferred between at least two positions (I, II), specifically a covered position (I), in which in particular the lock cylinder (101) is covered by the cover element (11) so as to be inaccessible from the outside, and an open position (II), in which in particular the cylinder lock (101) is uncovered by the cover element (11), and a tension means (12) for actuating the door lock, wherein the tension means (12) can be mechanically operatively connected with the cover element (11) in the open position (II) of the cover element (11), so as to actuate the door lock by pulling on the cover element (11). It is also possible to initially detach the tension means from the cover element, for example by undoing a corre-
(Continued)

sponding connection between the tension means and cover element, such as a form- and/or force fitting connection, clip and/or clamp connection, bayonet connection or the like, and then initiate the opening process directly on the tension means. To this end, the invention proposes that a triggering device (14) be provided for the cover element (11), so as to automatically transfer the cover element (11) into the open position (II), in particular in an emergency situation.

20 Claims, 4 Drawing Sheets (51) Int. Cl.
| | |
|---|---|
| E05B 79/20 | (2014.01) |
| E05B 81/90 | (2014.01) |
| E05B 85/10 | (2014.01) |
| E05B 17/10 | (2006.01) |
| E05B 79/04 | (2014.01) |
| E05B 81/04 | (2014.01) |
| E05B 81/10 | (2014.01) |
| E05B 81/56 | (2014.01) |
| B60J 5/04 | (2006.01) |
| E05B 17/14 | (2006.01) |
| E05B 77/34 | (2014.01) |
| E05B 79/06 | (2014.01) |
| E05B 81/82 | (2014.01) |
| E05B 81/86 | (2014.01) |
| E05B 85/02 | (2014.01) |
| F21V 3/06 | (2018.01) |
| E05B 79/10 | (2014.01) |
| E05B 79/08 | (2014.01) |

(52) U.S. Cl.
CPC ............ *E05B 17/183* (2013.01); *E05B 77/34* (2013.01); *E05B 79/04* (2013.01); *E05B 79/06* (2013.01); *E05B 79/20* (2013.01); *E05B 81/04* (2013.01); *E05B 81/10* (2013.01); *E05B 81/56* (2013.01); *E05B 81/82* (2013.01); *E05B 81/86* (2013.01); *E05B 81/90* (2013.01); *E05B 85/02* (2013.01); *E05B 85/10* (2013.01); *F21V 3/062* (2018.02); *E05B 79/08* (2013.01); *E05B 79/10* (2013.01); *Y10S 292/22* (2013.01); *Y10T 292/1047* (2015.04); *Y10T 292/1078* (2015.04); *Y10T 292/57* (2015.04)

(58) Field of Classification Search
CPC .......... E05B 81/90; E05B 17/10; E05B 17/14; E05B 17/163; E05B 77/34; E05B 77/02; E05B 77/04; E05B 77/08; E05B 77/10; E05B 77/12; E05B 77/54; E05B 77/06; E05B 79/04; E05B 79/06; E05B 79/20; E05B 79/08; E05B 79/10; E05B 85/02; E05B 85/10; E05B 85/107; E05B 85/06; E05B 85/01; B60J 5/04; F21V 3/0436; Y10S 292/22; Y10S 292/65; Y10T 292/57; Y10T 292/1047; Y10T 292/1078; Y10T 292/23
See application file for complete search history.

(56) References Cited

U.S. PATENT DOCUMENTS

| | | | | |
|---|---|---|---|---|
| 1,961,456 A * | 6/1934 | Rubner | ............... | E05B 17/183 70/455 |
| 2,096,568 A * | 10/1937 | Snively | ............... | E05B 17/183 70/455 |
| 2,904,985 A * | 9/1959 | Murphy | ............... | E05B 17/002 70/38 B |
| 4,023,388 A * | 5/1977 | Morvai | ............... | E05B 17/18 70/455 |
| 4,290,279 A * | 9/1981 | Fish | ............... | E05B 67/24 70/367 |
| 4,544,189 A | 10/1985 | Fiordellisi et al. | | |
| 4,594,866 A * | 6/1986 | Neyret | ............... | E05B 17/181 70/423 |
| 4,709,567 A * | 12/1987 | Appelbaum | ............... | E05B 17/183 70/455 |
| 4,825,673 A * | 5/1989 | Drake | ............... | E05B 17/14 70/455 |
| 5,109,686 A * | 5/1992 | Toussant | ............... | E05B 15/08 70/454 |
| 5,236,233 A | 8/1993 | Fukumoto et al. | | |
| 5,241,846 A * | 9/1993 | Hoke | ............... | E05B 17/183 70/423 |
| 5,394,711 A * | 3/1995 | Pitkanen | ............... | E05B 9/086 70/368 |
| 5,720,379 A * | 2/1998 | Schwartz | ............... | H01H 9/26 200/318.1 |
| 5,815,379 A * | 9/1998 | Mundt | ............... | G06F 1/181 361/679.55 |
| D408,262 S * | 4/1999 | Liu | ............... | D8/334 |
| 6,405,571 B2 | 6/2002 | Tyas | | |
| 6,467,316 B1 * | 10/2002 | Chen | ............... | E05B 17/002 70/416 |
| 6,494,070 B1 * | 12/2002 | Moss | ............... | E05B 17/183 292/DIG. 4 |
| 6,497,445 B1 * | 12/2002 | Combs, II | ............... | B60J 7/1621 296/100.06 |
| 6,908,140 B1 | 6/2005 | Carter et al. | | |
| 7,199,317 B2 | 4/2007 | Ieda et al. | | |
| 7,322,218 B2 * | 1/2008 | Yonemura | ............... | B60K 15/0409 220/210 |
| 7,363,786 B2 * | 4/2008 | TerHaar | ............... | E05B 13/108 292/216 |
| 7,581,423 B2 * | 9/2009 | Brojanac | ............... | E05B 17/002 70/423 |
| 7,598,915 B2 | 10/2009 | Ieda et al. | | |
| 7,819,442 B2 | 10/2010 | Ieda et al. | | |
| 8,636,309 B2 | 1/2014 | Muller et al. | | |
| 9,164,125 B2 | 10/2015 | Tsurumaki | | |
| 9,556,655 B2 | 1/2017 | Shimizu et al. | | |
| 9,631,398 B1 * | 4/2017 | Liu | ............... | E05B 17/185 |
| 2004/0055342 A1 * | 3/2004 | Chen | ............... | E05B 17/002 70/56 |
| 2005/0264024 A1 * | 12/2005 | Mulder | ............... | B60J 7/1621 296/100.07 |
| 2006/0061941 A1 | 3/2006 | Spies | | |
| 2007/0096905 A1 | 5/2007 | Ieda et al. | | |
| 2007/0115191 A1 | 5/2007 | Hashiguchi et al. | | |
| 2007/0193320 A1 * | 8/2007 | Niskanen | ............... | E05B 17/185 70/423 |
| 2007/0200359 A1 * | 8/2007 | Lewis | ............... | B60R 21/38 292/216 |
| 2009/0205383 A1 * | 8/2009 | Katagiri | ............... | E05B 17/18 70/237 |
| 2009/0279826 A1 | 11/2009 | Ieda et al. | | |
| 2010/0031714 A1 * | 2/2010 | Brown | ............... | E05B 47/00 70/91 |
| 2010/0107803 A1 * | 5/2010 | Ramsauer | ............... | E05B 1/0092 74/510 |
| 2010/0162777 A1 * | 7/2010 | Savant | ............... | E05B 17/186 70/101 |
| 2010/0237635 A1 | 9/2010 | Ieda et al. | | |
| 2010/0293753 A1 * | 11/2010 | Saitou | ............... | E05B 17/18 16/412 |
| 2012/0205924 A1 * | 8/2012 | Muller | ............... | E05B 85/107 292/336.3 |
| 2012/0205925 A1 * | 8/2012 | Muller | ............... | E05B 77/04 292/336.3 |
| 2013/0098123 A1 * | 4/2013 | Gorontzi | ............... | E05B 1/0092 70/201 |

(56) References Cited

U.S. PATENT DOCUMENTS

| | | | |
|---|---|---|---|
| 2014/0000167 A1* | 1/2014 | Patel | E05B 81/34 49/32 |
| 2014/0047877 A1* | 2/2014 | Bohm | E05B 85/107 70/275 |
| 2014/0062100 A1* | 3/2014 | Tamura | E05B 81/06 292/100 |
| 2014/0125071 A1* | 5/2014 | McWilliams | E05B 17/183 292/336.3 |
| 2014/0272305 A1 | 9/2014 | Helmy et al. | |
| 2016/0138303 A1* | 5/2016 | Beck | E05B 79/04 292/336.3 |
| 2016/0319573 A1* | 11/2016 | Da Deppo | E05B 79/06 |
| 2017/0058563 A1* | 3/2017 | Ichikawa | E05B 77/34 |
| 2017/0292297 A1* | 10/2017 | Bartels | E05B 85/107 |

FOREIGN PATENT DOCUMENTS

| | | | | |
|---|---|---|---|---|
| CN | 103339334 A | | 10/2013 | |
| CN | 203835089 U | | 9/2014 | |
| DE | 198 24 344 A1 | | 12/1999 | |
| DE | 103 09 821 A1 | | 9/2004 | |
| DE | 10324890 A1 | * | 12/2004 | E05B 77/02 |
| DE | 10341832 A1 | | 4/2005 | |
| DE | 20 2008 011 297 U1 | | 11/2008 | |
| DE | 102009045872 A1 | | 4/2011 | |
| DE | 10307364 A1 | | 9/2014 | |
| DE | 102013112122 A1 | | 5/2015 | |
| EP | 0 006 10 A2 | | 3/1979 | |
| EP | 0 516 992 A1 | | 12/1992 | |
| EP | 0 522 278 A1 | | 1/1993 | |
| EP | 1 473 423 A2 | | 11/2004 | |
| EP | 1 616 687 A1 | | 1/2006 | |
| EP | 2 096 237 A2 | | 9/2009 | |
| EP | 2 284 339 A2 | | 2/2011 | |
| EP | 3020892 A1 | | 5/2016 | |
| JP | H11 192660 A | | 7/1999 | |
| WO | WO2010072678 A1 | | 7/2010 | |

OTHER PUBLICATIONS

Extended European Search Report, dated Apr. 7, 2016, for corresponding European Patent No. 15 19 4090 with English translation.
International Search Report, dated Sep. 14, 2016, for corresponding International Application No. PCT/EP2016/062810 with English translation.
Written Opinion, dated Sep. 14, 2016, for corresponding International Application No. PCT/EP2016/062810 with English translation.
International Preliminary Report on Patentability, dated Aug. 21, 2017, for corresponding International Application No. PCT/EP2016/062810 with English translation.
Alois Körber, Analysis and Optimization of the Molecular Orientation Angle of Biaxially Stretched Poly(ethylene terephthalate) Film Webs, 2014 (PhD Thesis), https://mediatum.ub.tum.de/1167050.
China Office Action dated Aug. 2, 2018 for corresponding China application No. 201510771388.X (English version).
China Office Action dated Aug. 28, 2018 for corresponding China application No. 201510779901.X (English version).
European Office Action dated Sep. 21, 2018 for corresponding European application No. 15 194 090.5 with English translation.

* cited by examiner

DOOR HANDLE WITH REMOVABLE CAP

CROSS-REFERENCE TO RELATED APPLICATIONS

This application claims priority to German application no. 10 2014 116 641.8 filed on Nov. 13, 2014, which is hereby incorporated by reference in its entirety.

BACKGROUND OF THE INVENTION

1. Field of the Invention

The present invention relates to a door handle for a vehicle door or vehicle hatch of a motor vehicle according to the preamble of claim 1. The door handle is here designed with a removable cover element, in particular for covering a lock cylinder, wherein the lock cylinder is provided for unlocking and locking a door lock, and wherein the cover element can be transferred between at least two positions, specifically a covered position, in which in particular the lock cylinder is covered by the cover element so as to be inaccessible from the outside, and an open position, in which in particular the cylinder lock is uncovered by the cover element, and a tension means for actuating the door lock, wherein the tension means can be mechanically operatively connected with the cover element in the open position of the cover element, so as to actuate the door lock by pulling on the cover element or directly on the tension means.

2. Background

Known in the art are movable door handles for motor vehicles that can be transferred between a closed position and a retracted open position. Also known are fixed door handles, which are designed to be opened without active actuation, meaning among other things a movement of the door handle, and without using a mechanical key. Use is here made of automatic systems, e.g., the active or passive keyless entry system or keyless-go system, which make it possible to unlock a vehicle without any active assistance by an authorized driver, and automatically open the door. For this purpose, the driver must carry an electronic key with him or her in the form of an ID transponder, so as to identify him or herself to a security system in the motor vehicle. Such door handles most often use proximity sensors, which first detect the presence of a user, and then initiate an identification query to verify the authorization of the user. The security system can here communicate with the ID transponder in order to query an identification code. If no correct response follows, nothing happens, and the keyless entry system switches back to standby. Pulling on the movable door handle then has no effect, since the keyless entry system did not unlock the door lock. The door lock of a vehicle door with a fixed door handle is also not actuated in such a case. However, if authentication was successful, the keyless entry system unlocks the door lock, thereby making it possible to open the vehicle door by pulling on a movable door handle or activating another sensor on a fixed door handle. Alternatively, the vehicle can also be opened with a remote control device, which is usually integrated in the keyless entry key. In addition, there can be a mechanical emergency key, with which at least the driver door can be opened or unlocked when the vehicle battery of the vehicle is discharged, and the door lock cannot be automatically opened.

In modern motor vehicles, the lock cylinder for mechanically unlocking the door lock by means of an emergency key is most often covered by a cover element on the door handle, so as to protect the lock cylinder against environmental influences, and simultaneously achieve an attractive, flush appearance for the door handle with the vehicle body. In an emergency situation, e.g., given a dangerous lateral position, an accident or the like, the door lock is normally automatically unlocked, after which the vehicle door can be opened by pulling on a movable door handle. In fixed door handles, no sensor can be activated after the battery has been discharged so as to open the door lock. In order to still be able to open the door lock, the cover element can be provided with a tension means, for example, so as to open the vehicle door by pulling on the cover element. For this purpose, a slot can be provided in the vehicle door so as to lift up the cover element by engaging into the slot, for example with the edge of an emergency key, and then be able to more comfortably pull on the latter. In fixed door handles, it has here proven disadvantageous in the event of an accident that rescuers will be prevented from rendering first aid if they are possibly unfamiliar with fixed door handles, and thus do not know how to open the vehicle door. Another disadvantage is that the cover element can be damaged or scratched by manual lifting. In addition, the cover elements, which are often painted in the color of the automobile, are hard to find. But even in movable door handles, it may happen that the door handle jams and the lock cylinder remains covered, so that the door lock disadvantageously cannot be opened in emergency situations. In the worst case scenario, first aid may then be rendered too late.

SUMMARY OF THE INVENTION

Therefore, the object of the present invention is to create a door handle for a vehicle door that at least partially overcomes at least one of the mentioned disadvantages. In particular, the object of the invention is to provide a door handle that ensures an improved, in particular safer and intuitive, actuation of the door lock in an emergency situation.

Proposed for achieving this object is a door handle with the technical features in claim 1, to which the following special importance is attributed. Practical embodiments of the invention are listed in the dependent subclaims. To the extent appropriate, technical features of the door handle according to the invention apply in equal measure to various embodiments of the latter, thus allowing reciprocal references in this regard.

The invention here proposes a door handle for a vehicle door of a motor vehicle (automobile), which is equipped with a removable cover element, in particular for covering a lock cylinder, wherein the lock cylinder is provided for unlocking and locking a door lock, and wherein the cover element can be transferred between at least two positions, specifically a covered position, in which in particular the lock cylinder is covered by the cover element so as to be inaccessible from the outside, and an open position, in which in particular the cylinder lock is uncovered by the cover element, and a tension means for actuating the door lock, wherein the tension means can be operatively connected with the cover element in the open position of the cover element, so as to actuate the door lock by pulling on the cover element or directly on the tension means. It is here also conceivable that the cover element according to the invention can be provided not just to cover a lock cylinder, but also another essential element of a door lock and lock system or a security system of the motor vehicle, such as a pushbutton, a sensor, an antenna or the like. In other words, the proposed door handle for motor vehicle doors can be used on the driver side and passenger side, as well as on the rear vehicle doors or the luggage compartment door or hatch. Different technologies for locking and unlocking, i.e., for actuating the respective lock, can here be embedded in the vehicle door, wherein the cover element can serve to cover and protect one of the essential elements of the technology to be used. It is also conceivable for design reasons that the cover element can be provided on the driver side, for example, if the vehicle doors can be actuated by a central locking system, wherein a lock cylinder is only present on the driver side. While the cover element can then not help to cover the lock cylinder, it can still be designed for opening the passenger door according to the invention. It is also possible to initially detach the tension means from the cover element, e.g., by undoing a corresponding connection between the tension means and cover element, such as a form- and/or force fitting connection, clip and/or clamp connection, bayonet connection or the like, and then initiate the opening process directly on the tension means.

It is inventively significant with respect to the door handle that a trigger mechanism be provided for the cover element, so as to automatically transfer the cover element into the open position, in particular in an emergency situation. For example, an emergency situation can be understood as an accident, an electronics failure, a short circuit, a dangerous lateral position, excessive accelerations, etc. In such a situation, it can be important that the vehicle doors be automatically unlocked and a simplified, quasi-intuitive actuation of the door locks be enabled. This can ensure that the access to the interior can be guaranteed to the interior despite all possibly conceivable unfavorable circumstances, so as to assist the passengers as quickly as possible after an accident situation. To this end, the invention provides that the cover element be automatically (meaning independently, without any further activity by an individual) transferred into the open position by an additionally provided triggering device in an emergency situation. As a result, the cover element is not only easy to find and carefully handled, but also made easier for a helper to grip, so as to actuate the door lock by pulling on the cover element. The resultant advantage is that, should an emergency situation arise and normal operation of the door lock be impossible, the cover element does not have to be pulled out manually, and nor do the helpers have to look around for a long time trying to figure out how to actuate the door lock so that they can easily open the vehicle door if need be. The triggering device can preferably be situated on or in the door handle in a position not directly visible or at least concealed, which also takes aesthetic considerations into account.

According to the invention, the door handle can additionally be designed as a fixed outer door handle of an automobile, in particular one that is immovable relative to the door or hatch. In this case, the door handle can be rigidly mounted to the door or hatch. In an emergency situation, given an electronics failure and/or a power outage, or a discharged battery, such door handles can no longer be opened automatically, in particular by an electromechanical door lock. Even if the lock system is automatically unlocked (but not opened) after such an emergency situation, pulling on a fixed door handle is pointless. The door lock still remains locked in this case. The cover element can thereafter only be lifted out with the help of a special tool by deftly reaching under or into the door handle, so as to open the door lock by pulling on the cover element. However, if individuals are unfamiliar with the technology, the danger is that the door cannot be opened in a stressful situation. The invention counteracts this by proposing a special triggering device to fully automatically transfer the cover element into the open position, without any manual intervention. The rest of the procedure can then be executed in an absolutely intuitive manner. To this end, the helpers now only have to gently pull on the cover element, so as to actuate the door lock in particular in a purely mechanical fashion using the tension means connected thereto, and open the vehicle door.

In addition, the invention can provide that the tension means be designed for mechanically actuating the door lock. The invention can further provide that the door lock be designed so that it can be mechanically and/or electrically actuated. The tension means advantageously permits a mechanical actuation of the door lock if the electronics fail or no power is available to actuate the door lock during normal operation. The invention can likewise be used for purely mechanical or purely electrical as well as combination (door) locks. It is also advantageous to use the door handle according to the invention for other technologies, such as sensor, pushbutton, or piezo element-controlled door locks, which in part require that the door lock be electrically actuated. The cover element can here be used in the covering position to cover the sensor, pushbutton or piezo element, wherein the cover element in the open position can serve to alternatively purely mechanically actuate the respective element and/or the corresponding door lock. According to the invention, the vehicle door can in this way always be opened in case of an emergency. According to the invention, the door handle can be part of a security system of the motor vehicle, which can be provided for the door lock or lock system of the vehicle door or all doors, and ensures an authorized and safe actuation of the door lock.

The tension means can advantageously be flexible in design, taking the form of a Bowden cable, wire or plastic rope or a chain. It is also conceivable that the tension means be made out of a flexible, for example elastic, material. Not only flexible metals, such as steels, are here conceivable as suitable materials, so too are plastics, such as fiber-reinforced plastics. In this case, the achievable advantage is that, when lifting the cover element via the tension means, access can be easily gained to an emergency actuator situated in the outer door handle for a mechanism for opening a door or door lock.

According to the invention, the cover element can exhibit an anti-loss safeguard, in particular in the form of a joint, rope or hinge, so as to hold the cover element on the door handle in the open position secured against loss. For example, the resultant advantage is that the cover element can be easily assembled to the door handle. Consequently, this can also yield the technical advantage of not allowing the cover element to fall on the ground or be lost while being detached or removed. It is further conceivable that in particular the anti-loss safeguard can be an extension of the tension means. This can result in a simplified connection between the cover element and tension means, which can serve simultaneously as an anti-loss safeguard and/or an assembly aid for the cover element.

According to the invention, a locking element can advantageously be provided for the cover element, in particular in the form of at least one clamping, latching or clip element, which can transfer between at least two locations, specifically a locked location, in which the cover element can be secured in the covered position by the locking element, in particular form- and/or force fitting, and a released location, in which the cover element can be released by the locking element so as to transfer into the open position. On the one hand, this results in the advantage that the cover element always remains securely and safely fixed in one position, specifically the covered position, even while driving the motor vehicle, despite exposure to vibrations inside the door handle. On the other hand, this yields a reduction in noises, which can be produced by the movement of a detached cover element inside of the door handle.

The invention can provide that the cover element be detachable in design by introducing an opening mechanism, in particular the bit of an emergency key, into a slot in the door handle, so as to exert a mechanical effect on the cover element, in particular on the locking element, and transfer the cover element into the open position, in particular the locking element into the released location. The resultant advantage is that the cover element can be manually actuated in the event of just a power failure. The cover element can here be "pried" or "forced" away from the outer door handle by introducing a suitable object into the slot. At the same, it is conceivable that the locking element can be actuated by introducing a suitable object into the slot, so as to transfer the locking element from the locked location into the released location. The cover element can then automatically jump up into the open position, for example by exposure to the flash pressure of a gasket, or by a special pressure and/or spring means, which can preload the cover element in its open position.

According to the invention, the triggering device can exhibit a triggering means, so as to be able, in the event of an accident or emergency situation, to directly or indirectly, automatically, in particular mechanically, electrically, electromagnetically, electromechanically or pyrotechnically, act on the cover element, in particular on the locking element, and transfer the cover element into the open position, in particular the transfer locking element into the released location. The invention here proceeds from the idea that an additional emergency operating mode can be provided aside from the normal operating mode of the door lock, when all systems are properly functioning and enough power is available for automatically actuating the closing device, and aside from the operating mode in which power is not available, in particular when the auto battery is discharged and the cover element can only be manually actuated. This operating mode is provided for instances in which an emergency situation arises, but also in cases where only the power has been consumed. According to the invention, the triggering device, in particular the triggering means, here causes the cover element or locking element to be directly or indirectly actuated, so as to transfer the cover element into the open position or the locking element into the released location. It is here conceivable that the triggering means can be activated when all other systems have failed or are temporarily not functional. The triggering means can utilize varying technologies for triggering in an emergency situation. Conceivable here is a mechanical function for the triggering means, for example if the deformation energy of the outer vehicle skin or movement of a crash lever is used to actuate the triggering means in the event of an accident. For example, an electrical function of the triggering means is conceivable if the emergency situation leads to the activation of an emergency energy storage device for actuating the triggering means. A combined electromagnetic or electromechanical function of the triggering means is here also conceivable if the mechanical deformation can prompt an electrical or magnetic activation of the triggering element. Last but not least, a pyrotechnic function for the triggering element is possible, if a targeted, minimal explosion triggered by the emergency situation can result in the triggering element being activated.

A crash sensor, acceleration sensor, tilt sensor or the like can be used as the trigger sensor (also referred to as emergency situation sensor or crash sensor) for the electrical function of the triggering means.

It can also be provided according to the invention that the triggering means be designed as a shape-memory-alloy element (FGL element), a permanent or electric magnet, e.g., a coil, a piezo element or a pyrotechnic element. The shape-memory-alloy element can advantageously be energized upon detection of an emergency situation, allowing it to heat up, and thereby mechanically deform. The mechanical deformation of the shape-memory-alloy element can then be utilized according to the invention to activate the triggering device, so as to transfer the locking element into the released location and/or the cover element into the open position. The triggering means can here advantageously be fabricated out of a wire comprised of a shape memory alloy, which can exhibit a diameter of between 0.1 mm and 1 mm, in particular of between 0.2 mm and 0.8 mm, in particular 0.4 mm. In all temperature ranges of between −40 to +85° C., the shape-memory-alloy element can generate a tensile force of at least 20 to 80 N, in particular of 25 N, in order to activate the cover element or locking element. This tensile force can be generated after applying current briefly for 1 to 3 s, in particular for 1.5 s. The current applied need not exceed 3.5 A given a preferred voltage in the motor vehicle advantageously measuring 12 V. For example, a triggering means in the form of a permanent magnet can displace the permanent magnet in such a way by deforming the door panel as to attract or repel the locking element and/or cover element and/or a pressure means or retaining means for the locking element or for the cover element, in order to correspondingly actuate the locking element and/or cover element. Instead of the permanent magnet, use can also be made of a coil for the required magnetic force, which can likewise be energized. If necessary, a piezo element can convert the mechanical deformation energy of the door panel into electrical energy, so as to actuate the locking element and/or cover element. The piezo element can also be energized by the triggering sensor. Finally, it is conceivable for a pyrotechnic element to be activated by the mechanical deformation energy of the door panel, as a result of which a targeted, controlled explosion can be initiated so as to actuate the locking element and/or cover element. It is here also conceivable for the triggering sensor to be able to activate the pyrotechnic element.

To this end, the invention can provide that it be possible to connect the triggering device with at least one emergency situation sensor or crash sensor, wherein the triggering device can be activated in particular upon detection of an emergency situation by the at least one emergency situation sensor, so as to transfer the cover element into the open position, in particular the locking element into the released location. Various emergency sensors are here possible, which can detect values that stand out owing to an accident, such as too high a tilt angle, too high a speed or acceleration or too strong a mechanical deformation of the motor vehicle or the like.

According to the invention, the cover element and tension means can be connected directly or by a joining means. The joining means can here take the form of an acceptance, a hook, an eyelet, a clamp or a clip, in particular formed on the cover element, so as to engage onto the tension means. For example, the resultant advantage is that the tension means can be easily connected with the cover element. In particular within the scope of the assembly process, one end of the tension means can be quickly and easily connected with the joining element. As a result, the triggering device can be used to simplify both the pure mechanical actuation of the tension means and the activation of the tension means owing to the emergency situation via the cover element.

It can further be advantageous for the cover element and joining element to be designed as a uniform material, in particular as a monolithic component. In other words, the cover element and joining element can be fabricated as an integral component. The resultant advantage is that the complexity involved in manufacturing the two elements as just a single component can be reduced, since at least one step of joining together the joining element and cover element is economized. Another resultant advantage is that an improved tensile force can be transmitted from the cover element to the tension means if it becomes necessary to actuate the tension means. As a consequence, a user engaged in operating or actuating the tension means does not first have to actuate the cover element, and then look for the end of the tension means to be able to actuate the door lock, but rather can simply by grabbing and pulling of the cover element pull out the tension means and initiate an emergency opening of the vehicle door.

The door handle and/or cover element can advantageously be made out of a plastic, especially taking the form of an injection molded plastic part. This makes production cost-effective and easy, and also reduces the weight of these elements. It is here conceivable for the exterior of the door handle and/or cover element to be chromium-plated and/or painted, so as to ensure a uniform, high-quality appearance of the vehicle door.

Within the framework of the invention, it is additionally conceivable that a control unit be provided for the triggering device in order to control the triggering device. To this end, the control unit can be integrated into a central control unit of the motor vehicle, or designed as a separate control unit. In the latter case, it is conceivable for the control unit to be integrated into the vehicle door, in particular directly into the door handle. At the same time, it is conceivable that the control unit be advantageously operated independently of the vehicle battery and/or be able to supply itself with power. It is here conceivable that the control unit be equipped with its own emergency power source, or have a mechanism that uses the emergency situation to generate power, for example by utilizing the energy from acceleration, breaking and/or deformation. As a consequence, it is here advantageous that the control unit and triggering device act independently of all other vehicle systems, and be able to function smoothly even in an emergency. The corresponding electronics and accompanying emergency situation sensors can here advantageously be integrated into the door handle along with the control unit.

According to the invention, the door handle can completely or partially integrate a keyless entry system as a security system for the lock system or door lock of the vehicle door. It may here be advantageous to integrate a proximity sensor, in particular in the form of a capacitive, optical, acoustic sensor or pressure sensor, into or onto the door handle, in particular below the cover element, so as to detect a user approaching the motor vehicle. After an approach has been detected, the security system in the motor vehicle can be activated to perform an authorization query with an ID transponder. Given a positive authentication, another sensor in the door handle can thereupon be used to detect the intention of the authorized user to open the vehicle door, specifically by sensing the hand of the user as it reaches into the recessed grip of the door handle. Two proximity sensors, in particular two capacitive sensors, can here be advantageously integrated into the door handle, in particular below the cover element, so as to be able to monitor an area directed outwardly from the door handle and an area directed inwardly from the door handle.

BRIEF DESCRIPTION OF THE DRAWINGS

Additional measures and advantages along with technical features of the invention may be gleaned from the claims, the following description and the drawings. Different features may here be advantageous taken in isolation and in any desired combination without departing from the scope of the invention. On the figures below, the door handle according to the invention is shown in detail in several exemplary embodiments. Shown on:

DETAILED DESCRIPTION OF SPECIFIC EMBODIMENTS

In the figures below, the same technical features are marked with the same reference numbers, even those from various exemplary embodiments.

Figures 1, 3:
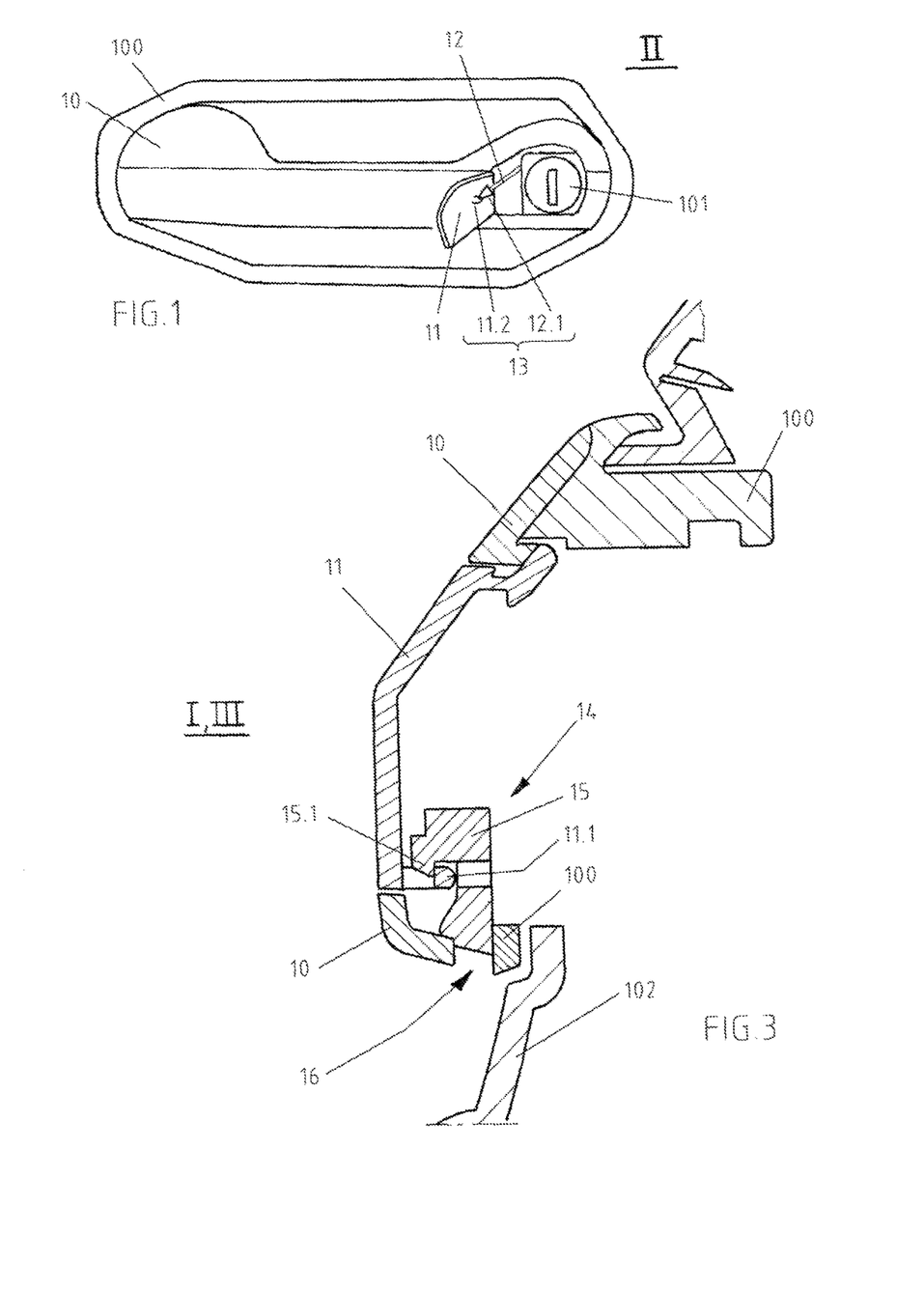
FIG. 1 is a schematic view of a door handle according to the invention.
FIG. 3 is a cross sectional view of the door handle according to the invention.

FIG. 1 shows a door handle 10 according to the invention in a vehicle door 102 or vehicle hatch 102 of a vehicle body 102, which is designed with a removable cover element 11 that serves in particular to cover a lock cylinder 101. The lock cylinder 101 is here provided for unlocking and locking a door lock (not shown). The door handle 10 is secured by a mounting element 100 to the vehicle body 102 of the motor vehicle (outer vehicle skin 102), and constitutes part of a security system inside the motor vehicle. According to the invention, the cover element 11 is mounted so that it can transfer between at least two positions: A covered position I, in which the lock cylinder 101 is covered by the cover element 11 so as to be inaccessible from outside, and which is shown on FIGS. 2a, 3, 4a and 4b, and an open position II, in which the lock cylinder 101 is released by the cover element 11 and freely accessible from outside. The open position II of the cover element 11 is shown on FIGS. 1 and 2b. Further conceivable is a retracted position of the cover element 11, which will be described in detail below. In addition, the door handle 10 according to the invention is equipped with a tension means 12 for actuating the door lock (not shown), wherein the cover element 11 and tension means 12 are mechanically connected by a joining means 11.2 on the cover element, and by a complementary joining means 12.1 on the tension means 12. The joining means 11.2 on the cover element 11 and the complementary joining means 12.1 on the tension means 12 together form an anti-loss safeguard 13 for the cover element 11, which ensures that the cover element is held in the open position II on the door handle 10 and is not lost, even when the cover element 11 is pulled out. If the cover element 11 is open, the tension means 12 can be actuated according to the invention by pulling on the cover element 11, so as to mechanically open the door lock.

Figure 6A:
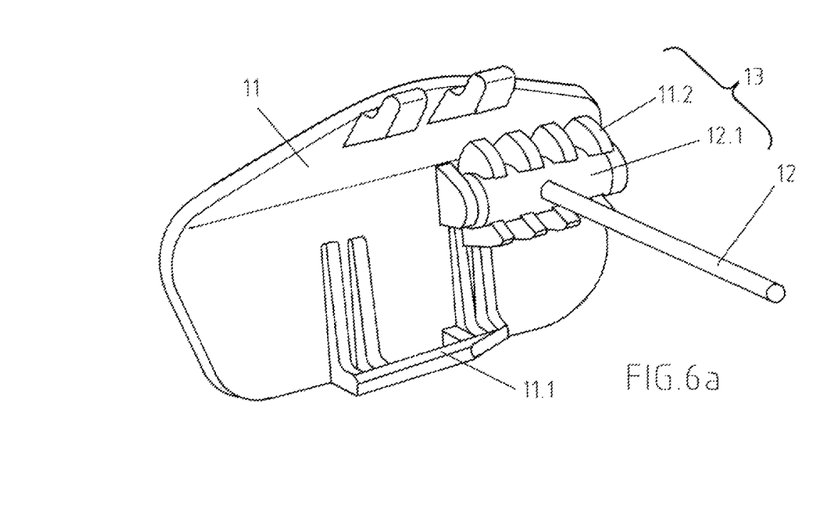
FIG. 6a is a perspective view of the cover element according to the invention from the inside.
Figure 6B:
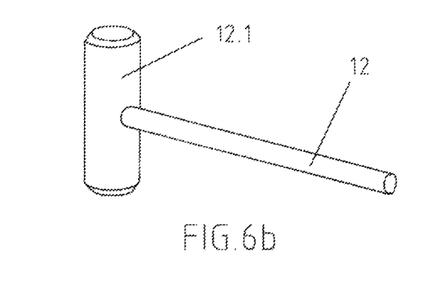
FIG. 6b is a perspective view of a tension means according to the invention.

In the example on FIG. 1, the joining means 11.2 is designed as a hook, into which the complementary joining means 12.1 engages in the form of a loop, so as to establish the connection between the cover element 11 and tension means 12. In the example on FIGS. 6a and 6b, the joining means 11.2 is designed as an acceptance with several latching elements that clasp the complementary joining means 12.1, which takes the form of a cylinder at the end of the tension means 12. Aside from that, numerous embodiments are conceivable for the joining means 11.2 and 12.1, which can result in an anti-loss safeguard 13 and ensure an in particular form- and/or force fitting, preferably detachable connection between the cover element 11 and tension means 12. However, it is alternatively also conceivable that the cover element 11 and tension means 12 be designed as a uniform material, in particular as a monolithic component.

According to the invention, the tension means 12 is designed as a Bowden cable. The Bowden cable leads to the door lock (not shown), so as to mechanically convey the effect of actuating the cover element 11 to the door lock once the door lock has been unlocked by the closing device (also not shown). At the same time, it is conceivable that the tension means 12 be made out of any flexible, for example elastic, material, which can convey the tensile force to the door lock in the pulling direction. The mechanical actuation of the door lock by pulling on the tension means 12 can involve an in particular purely mechanical emergency actuation of the door lock, wherein the operational mechanism of the door lock can in equal measure be mechanical, electrical or electromechanical.

Figures 2A, 2B:
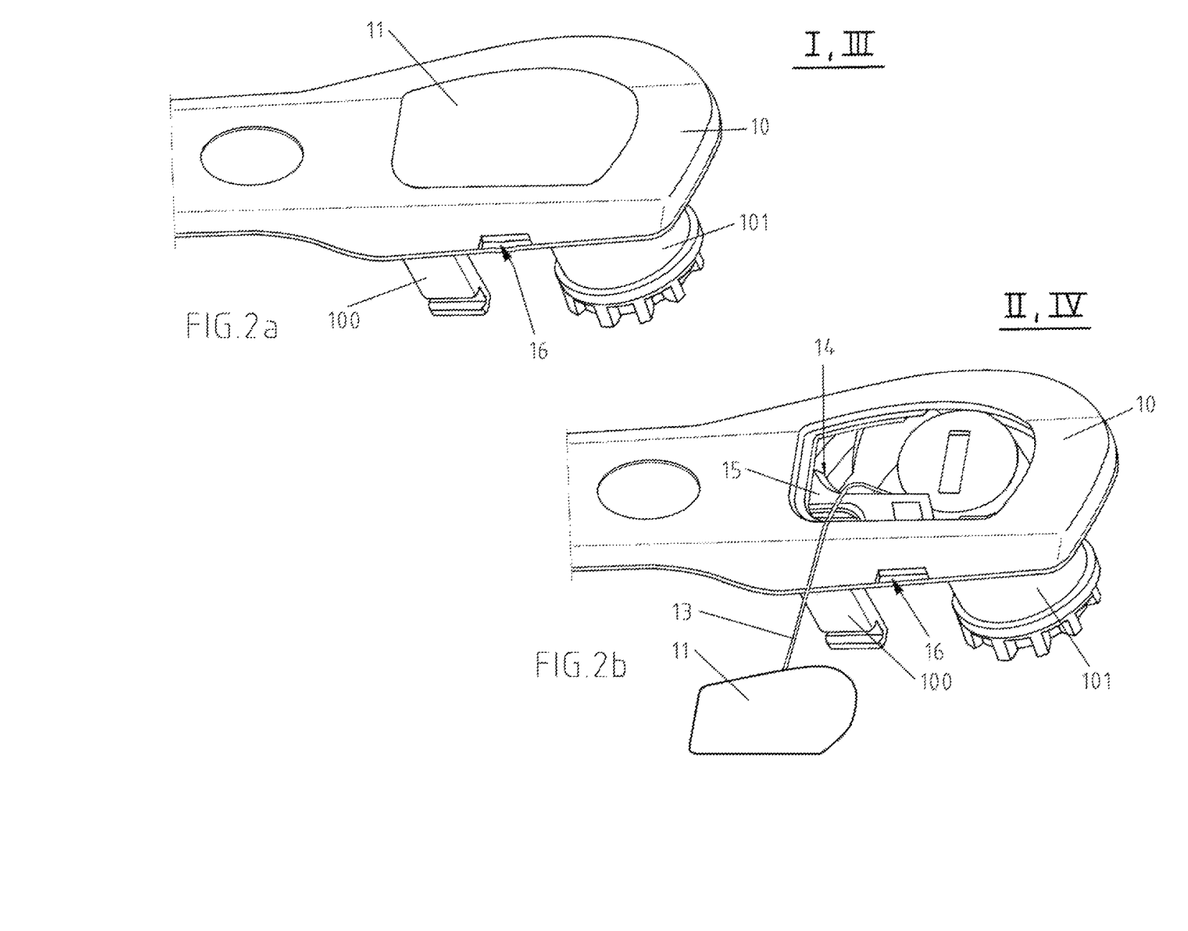
FIG. 2a is a schematic sectional view of a cover element according to the invention in a covered position.
FIG. 2b is a schematic view of the cover element according to the invention in an open position.
Figure 5:
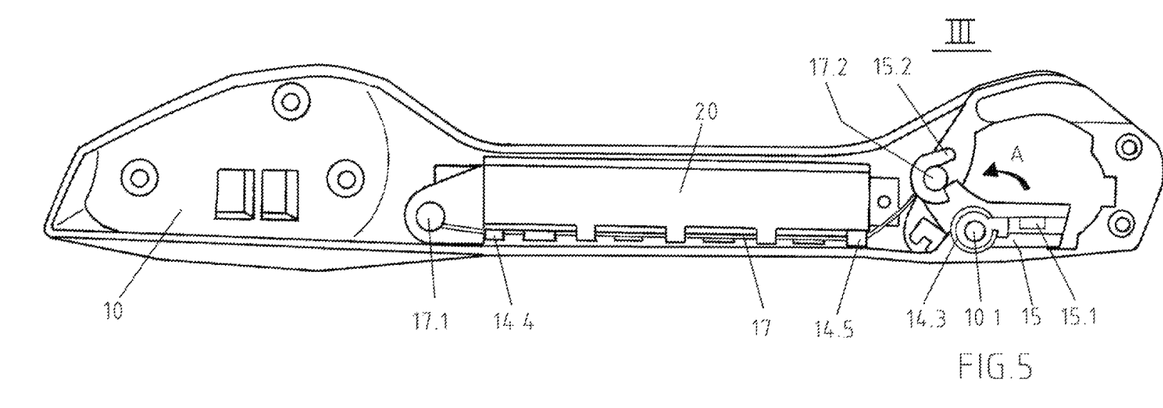
FIG. 5 is a rear view of the door handle according to the invention in a second embodiment.

The shown door handle 10 is a fixed door handle 10, which is immovably secured to the body 102 on a mounting element 100, for example as depicted on FIG. 2. The fixed door handle 10 is designed to cause the vehicle door to open without being actively actuated, i.e., without pulling out the door handle 10 relative to the outer door skin 102. According to the invention, the keyless entry system can be used as the security system for the door handle 10. During normal operation, such a system is used to unlock a vehicle without any active assistance by an authorized driver and automatically open the vehicle door. In order to activate the keyless entry system, the driver must carry a corresponding ID transponder (meaning an electronic key or remote key), which can communicate with the keyless entry system, so as to identify him or herself as an authorized user. As an option, two proximity sensors (not shown in any more detail) for the keyless entry system are embedded in the door handle 10 according to the invention. FIG. 5 here schematically illustrates that the electronics 20 can be arranged inside the door handle 10 to ensure an automatic actuation of the door lock. The electronics 20 can here completely or partially accommodate or encompass the keyless entry system, complete with the proximity sensors, communication elements and a control unit. A first proximity sensor can here monitor the area of the motor vehicle lying on the outside, and serve to detect the presence of a user in this area. Finally, the electronics 20 can ensure that an identification query is performed between the keyless entry system and ID transponder. The keyless entry system can here query the ID transponder for an identification code. If it then fails to provide a correct answer, nothing more happens, and the keyless entry system turns itself off again or switches to standby. However, if the answer then provided is correct, the keyless entry system unlocks the door lock, and activates or checks the second proximity sensor that monitors the door handle recess lying on the inside for the presence of a user's hand, so as to detect the intention of the user to open the door lock. After that, the vehicle door 102 can automatically spring open in response to the action of a door seal, or be opened by grabbing the door handle 100 and pulling on the vehicle door 102. The fixed door handle 100 according to the invention here does not alter its position relative to the vehicle body 102. The vehicle door 102 can likewise be opened by pressing a button on the ID transponder, which acts as a kind of remote control. However, if the battery in the ID transponder or vehicle battery is empty, the door lock cannot be automatically actuated, since there is no power for operating the proximity sensors or implementing the security query. In this case, the ID transponder still has a mechanical emergency key integrated into it with which at least the driver door can be opened if the lock cylinder 101 is made accessible. To this end, the cover element 11 must be transferred into the open location II shown on FIGS. 1 and 2b.

If only the power in the ID transponder and/or keyless entry system has been expended, the process depicted on FIGS. 3 and 4b can subsequently be followed so as to be able to mechanically open the door lock. To this end, a slot 16 is provided in the door handle 10 (see FIGS. 1, 2a, 2b, 4a and 4b), so that the cover element 11 can be lifted up by reaching into the slot 16, for example with the edge of an emergency key, and then pulled more conveniently using the latter. As evident from FIGS. 3 and 4b, the cover element 11 can be secured by a locking element 15 if the cover element 11 is in the covered position I and flush with the rest of the door handle 10. The locking element 15 can then be lifted through insertion into the slot 16, so as to release the cover element 11. According to the invention, the locking element 15 exhibits two locations: A locked location III, in which the cover element 11 is form- and/or force fitting held in the covered position I by the locking element (see FIGS. 2a, 3, 4a and 4b), and a released location IV, in which the cover element 11 is released by the locking element 15 so as to be transferred into the open position I (see FIGS. 1 and 2b). It is here advantageous that the cover element 11 remains safely fixed in the covered position II, even while driving the motor vehicle. In order to form- and/or force fitting fix the cover element 11 in place, the cover element 11 exhibits a latching means 11.1, which can interact with a complementary counter-latching means 15.1 of the locking element 15, as shown on FIGS. 3, 4b, 5 and 6a. If the locking element is lifted in direction B using the emergency key as depicted on FIG. 4b, the latching means 11.1 is released by the counter-latching means 15.1. The cover element 15 is then free to be removed. However, it is alternatively also conceivable for the cover element 11 to be lifted up directly by means of a suitable tool. FIG. 5 here shows another possible embodiment of the locking element 15, which is pivoted around a pin 10.1 on the interior side of the door handle 10, and loaded by a spring 14.3 in the locked location III, into which the counter-latching means 15.1 in the form of a nose engages into a corresponding acceptance 11.1 as a latching means 11.1 on the cover element 11. A specially configured activation element 17 can allow the locking element 15 to pivot into the released location IV and release the cover element 11. The design of the activation element 17 will be discussed below drawing reference to FIGS. 4a, 4b and 5.

However, in the case of fixed door handles, such as the door handle 10 shown, stock must be taken of situations where stress during an accident might prevent strangers not familiar with such door handles 10 from thinking calmly and determining how the unknown door lock can be opened. The cover element 11 runs flush with the rest of the door handle 10 and vehicle body 102, and can here also easily be overlooked. In addition, the slot 16, in the absence of any awareness of its presence and function, might be hard to spot in an emergency situation, let alone be used correctly. But even in movable vehicle doors 102, it can happen that the door handle 10 jams, and the lock cylinder 101 remains covered by the cover element 11.

The invention counteracts the enumerated disadvantages by ensuring that the cover element 11 is automatically opened in the event of an emergency situation. After that, one can proceed quasi-intuitively to actuate the lock cylinder 101 and open the door lock. The invention here proposes that a triggering device 14 be provided for the cover element 11, so as to automatically transfer the cover element 11 into the open position II, in particular given an emergency situation. According to the invention, an emergency situation can arise in the event of an accident, electronics failure, short circuit, dangerous lateral position, excessive accelerations or the like. In such a situation, it is important to ensure that access to the vehicle interior is not impeded should help become necessary and/or passengers be unable to free themselves from inside the vehicle.

According to the invention, the vehicle doors 102 are initially automatically unlocked once an emergency situation has been detected. Thereafter or even simultaneously, the triggering device 14 causes the cover element 11 to spring up automatically. The cover element 11 can then be actuated purely intuitively, so as to open the door lock. To this end, all that must be done is to pull on the cover element 11, wherein the tension means 12 conveys the mechanical tensile force to the door lock. The fact that cover element 11 springs up automatically makes it easy to find. In addition, it is advantageous that the cover element 11 can be handled gently, without becoming damaged or scratched, since the automatic opening feature makes it easier to grab. In the event of an accident, helpers also do not have to spend a lot of time looking around or thinking about how they can release and actuate the door lock so as to get into the vehicle interior. According to the invention, the triggering device 14 is located inside the door handle 10.

Figure 4A:
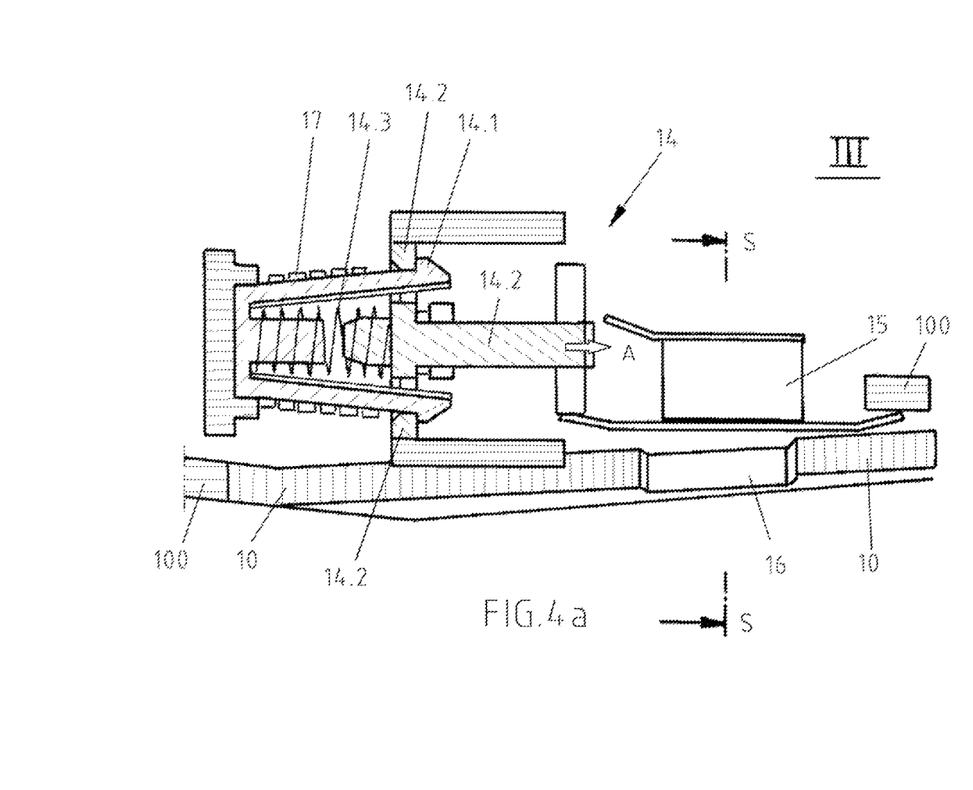
FIG. 4a is a longitudinal sectional view of the door handle according to the invention in a first embodiment.

According to the invention, the triggering device 14 is designed with a triggering means 17, which can, in an emergency situation, directly or indirectly, in particular automatically, act on the cover element 11 or locking element 15, and transfer the cover element 11 into the open position II or the locking element 15 into the released location IV. FIGS. 4a and 4b here show a first possible embodiment of the triggering device 14, and FIG. 5 shows a second possible embodiment of the triggering device 14, which will be described in detail below. In both examples, the triggering means 17 is designed as a shape-memory-alloy element (FGL element), which is energized upon detection of an emergency situation, allowing it to heat up, and thereby mechanically deform. The mechanical deformation of the shape-memory-alloy element 17 can then be utilized according to the invention to transfer the locking element 15 into the released location IV.

Figure 4B:
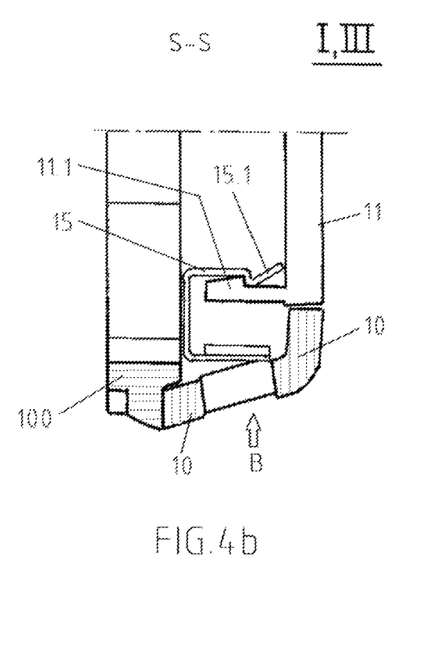
FIG. 4b is a sectional view of the door handle according to the invention depicted on FIG. 4a along a vertical sectional line S-S.

FIGS. 4a and 4b show the triggering device 14 with a triggering means 17 in the form of a wire, which is wound around a conical retaining means 14.1. The retaining means 14.1 is here fastened to the mounting element 100 with a closed, narrower side, and at another, open end exhibits a protruding ring on the outside. In the normal operating mode of the motor vehicle, the triggering means 17 abuts loosely against the retaining means 14.1. The open end of the retaining means 14.1 with the ring as a latching means 11.1 here engages into an annular opening in a pressure means 14.2. As a consequence, the retaining means 14.1 holds the pressure means 14.2 spaced apart from the locking element 15, which is here located in the locked location III. The pressure means 14.2 is pre-loaded with a projection in the direction A toward the locking element by means of a compression spring 14.3, which is pre-loaded between the retaining means 14.1 and pressure means 14.2. Should the latched connection between the retaining means 14.1 and pressure means 14.2 here be dissolved, the pressure means 14.2 is accelerated in direction A toward the locking element 15. As a result, the locking element 15 can be lifted up, and the cover element 11 can be released. As shown on FIG. 4b, the latched connection between the latching means 11.1 of the cover element 11 and counter-latching means 15.1 of the locking element can here be dissolved. As a result, the locking element 15 can be transferred out of the locked location III into the released location IV, so that the cover element 11 can be transferred from the covered position I into the open position II. According to the invention, the triggering means 17 can for this purpose be energized, so as to then heat up and draw together, so that the open end of the retaining means 14.1 is compressed, and the pressure means 14.2 is released. In order to obtain the necessary power, the door handle 10 can incorporate a separate power source, e.g., a battery, which can energize the triggering means 17 once an emergency situation has been detected by one or more emergency situation sensors (not shown). Alternatively, it is also conceivable for the power to be obtained by utilizing the emergency situation, for example by converting the deformation energy of the door panel into electrical power or the like.

FIG. 5 shows the triggering device 14 with a triggering means 17 comprised of an oblong wire that is stretched between two ends 17.1 and 17.2. The first end 17.1 here rests on the door handle 10, and the second end 17.2 on the locking element 15. The second end 17.2 can here latch onto a leg 15.2 of the locking element. The locking element 15 is here pivoted to the projection 14.3, which is formed on the inside of the door handle 10. Formed on the other leg of the locking element 15 is the counter-latching means 15.1, which can latch with the latching means 11.1 of the cover element 11 depicted on FIG. 6a. The locking element 15 is here pre-loaded by the spring 14.3 against a direction A, i.e., in the direction from the released location IV to the locked location III. During normal operation, the triggering means 17 abuts loosely against the door handle 10. The triggering means 17 is here guided in a guide on the inside of the door handle 10, wherein the guide can exhibit a row of hooks to better retain the triggering means 17, for example which can alternate between the top and bottom of the guide. However, should an emergency situation arise, voltage is applied between two power outlets 14.4 and 14.5 provided on the door handle 10 in proximity to the ends 17.1 and 17.2 of the triggering means 17. The triggering means 17 then heats up and contracts. As a result, the second end 17.2 of the triggering means 17 pulls on the leg 15.2 of the locking element 15, and pivots the latter in direction A around the projection 14.3, i.e., in the direction from the locked location III into the released location IV. The counter-latching means 15.1 is detached from the latching means 11.1 in this direction A, and thereby releases the cover element 11. In addition, the invention can provide that the triggering means 17 be able to utilize different technologies so as to be actuated in an emergency situation. Conceivable here is a mechanical, electrical, combined electromagnetic or electromechanical, as well as pyrotechnic actuation of the triggering means 17.

In conclusion, let it be noted that the exemplary embodiments and variants illustrated here for the door handle 10 according to the invention can be combined with each other as desired, provided they do not explicitly preclude each other. For example, the cover element 11 can be locked in various ways. It is further conceivable that the cover element 11 can be actuated directly by the triggering device 14, without the locking element 15. In particular, it can be provided that the triggering device 14 can utilize different technologies for actuating the triggering means 17.

REFERENCE LIST

10 Door handle
10.1 Pin
11 Cover cap
11.1 Latching means
11.2 Joining means
12 Tension means
12.1 Complementary joining means
13 Anti-loss safeguard
14 Triggering device
14.1 Retaining means
14.2 Pressure means
14.3 Spring
14.4 Power outlets
14.5 Power outlets
15 Locking element
15.1 Counter-latching means
15.2 Gripping end
16 Slot in the door handle
17 Triggering means
17.1 First end
17.2 Second end
20 Electronics
100 Mounting element
101 Lock cylinder
102 Vehicle door, vehicle hatch, vehicle body
I Covered position of the cover element
II Open position of the cover element
III Locked location of the locking element
IV Released location of the locking element
A Direction for automatically moving the locking element into the released location
B Direction for manually moving the locking element into the released location

What is claimed is:

1. A door handle (10) for a vehicle door of a motor vehicle, with
    a removable cover element (11), in particular for covering a lock cylinder (101), wherein the lock cylinder (101) is provided for unlocking and locking a door lock, and wherein the cover element (11) can be transferred between at least two positions (I, II), specifically
    a covered position (I), in which in particular the lock cylinder (101) is covered by the cover element (11) so as to be inaccessible from the outside,
    and an open position (II), in which in particular the lock cylinder (101) is uncovered by the cover element (11),
    and a tension means (12) for actuating the door lock, in order to open the vehicle door when the door lock is unlocked,
    wherein the tension means (12) can be mechanically operatively connected with the cover element (11) in the open position (II) of the cover element (11), so as to actuate the door lock by pulling on the cover element (11), wherein the tension means (12) transfers a mechanical tension force to the door lock,
    characterized in that
    a triggering device (14) is provided for the cover element (11), so as to automatically transfer the cover element (11) into the open position (II), in particular in an emergency situation.

2. The door handle (10) according to claim 1, characterized in that
    the door handle (10) is designed as a fixed outer door handle of an automobile (10), in particular one that is immovable relative to the vehicle door.

3. The door handle (10) according to claim 1, characterized in that
    the tension means (12) is designed for mechanically actuating the door lock, wherein in particular the door lock is designed so that it can be mechanically and/or electrically actuated.

4. The door handle (10) according to claim 2, characterized in that
    the tension means (12) is designed for mechanically actuating the door lock, wherein in particular the door lock is designed so that it can be mechanically and/or electrically actuated.

5. The door handle (10) according to claim 1, characterized in that
    the tension means (12) is designed as a Bowden cable or a chain, and that in particular the tension means (12) is made out of a flexible material.

6. The door handle (10) according to claim 1, characterized in that
    the cover element (11) exhibits an anti-loss safeguard (13), in particular in the form of a joint, rope or hinge, so as to hold the cover element in the open position secured against loss,
    and that in particular the anti-loss safeguard (13) is an extension of the tension means (12).

7. The door handle (10) according to claim 1, characterized in that
    a locking element (15) is provided for the cover element (11), in particular in the form of a clamping, latching or clip element, which can transfer between at least two locations (III, IV), specifically
    a locked location (III), in which the cover element (11) is secured in the covered position (I) by the locking element (15), in particular form- and/or force fitting,
    and a released location (IV), in which the cover element (11) is released by the locking element (15) so as to transfer into the open position (II).

8. The door handle (10) according to claim 1, characterized in that
    the cover element (11) is detachable in design by introducing an opening mechanism, in particular the bit of an emergency key, into a slot (16) in the door handle (11), so as to exert a mechanical effect on the cover element (11), in particular on a locking element (15), and transfer the cover element (11) into the open position (II), in particular the locking element (15) into the released location (IV).

9. The door handle (10) according to claim 1, characterized in that
the triggering device (14) exhibits a triggering means (17), so as to, in the event of an accident, directly or indirectly, automatically, in particular mechanically, electrically, electromagnetically, electromechanically or pyrotechnically, act on the cover element (11), in particular on a locking element (15), and transfer the cover element (11) into the open position (II), in particular the locking element (15) into the released location (IV).

10. The door handle (10) according to claim 9, characterized in that
the triggering means (17) is designed as a shape-memory-alloy element (FGL element), of a permanent or electric magnet or a piezo element.

11. The door handle (10) according to claim 1, characterized in that
the triggering device (14) can be connected with at least one emergency situation sensor or crash sensor, wherein the triggering device (14) can be activated in particular upon detection of an emergency situation by the at least one emergency situation sensor, so as to transfer the cover element (11) into the open position (I), in particular a locking element (15) into the released location (III).

12. The door handle (10) according to claim 1, characterized in that
the cover element (11) and tension means (12) can be connected directly or by a joining means (11.2).

13. The door handle (10) according to claim 12, characterized in that
the joining means (11.2) takes the form of a recess, a hook, an eyelet, a clamp or a clip, so as to engage onto the tension means (12).

14. The door handle (10) according to claim 1, characterized in that
the cover element (11) and tension means (12) are designed as a uniform material, in particular as a monolithic component.

15. The door handle (10) according to claim 1, characterized in that
the door handle (10) and/or cover element (11) are made out of a plastic, particularly taking the form of an injection molded plastic part.

16. The door handle (10) according to claim 1, characterized in that
a control unit is provided for the triggering device (14) in order to actuate the triggering device,
and that in particular the control unit is integrated into a central control unit of the motor vehicle.

17. The door handle (10) according to claim 1, characterized in that
a keyless entry system is integrated in the door handle (10).

18. The door handle (10) according to claim 1, characterized in that
at least one proximity sensor, in particular in the form of a capacitive, optical, acoustic sensor or pressure sensor, is integrated into the door handle (10), in particular below the cover element, so as to detect a user approaching the motor vehicle.

19. The door handle (10) according to claim 1, characterized in that
a security system is provided for the door handle (10) in order to query the authorization of a user.

20. The door handle (10) according to claim 1, characterized in that
an emergency power supply is provided for the triggering device (14), so as to activate the triggering device,
and that in particular the emergency power supply exhibits at least one capacitor, a Gold Cap capacitor, an accumulator or a film battery, so as to supply power to the triggering device (14).

* * * * *